J. L. SEABERG.
NUT LOCK.
APPLICATION FILED FEB. 23, 1916.

1,192,232.

Patented July 25, 1916.
2 SHEETS—SHEET 1.

Witnesses
Frederick W. Ely

Inventor
John L. Seaberg.
By Victor J. Evans
Attorney

J. L. SEABERG.
NUT LOCK.
APPLICATION FILED FEB. 23, 1916.

1,192,232.

Patented July 25, 1916.
2 SHEETS—SHEET 2.

Witnesses
Frederick W. Ely
Wm. J. Forth

Inventor
John L. Seaberg.
By Victor J. Evans
Attorney

UNITED STATES PATENT OFFICE.

JOHN L. SEABERG, OF COAL CENTER, PENNSYLVANIA.

NUT-LOCK.

1,192,232.  Specification of Letters Patent.  Patented July 25, 1916.

Application filed February 23, 1916. Serial No. 80,047.

*To all whom it may concern:*

Be it known that I, JOHN L. SEABERG, a citizen of the United States, residing at Coal Center, in the county of Washington and State of Pennsylvania, have invented new and useful Improvements in Nut-Locks, of which the following is a specification.

This invention relates to improvements in nut locks.
An object of the invention is to provide a nut lock wherein two nuts are employed each being screwed upon a bolt and having a resilient connection therebetween whereby the screwing of the outer nut will also cause the screwing of the inner nut to force the latter into tight contact with the superstructure connected by the bolt, and whereby a tension between the inner and outer nuts is at all times maintained; means being provided for locking the outer nut to the bolt when both of the nuts have been screwed the desired length upon the bolt.

Figure 1:
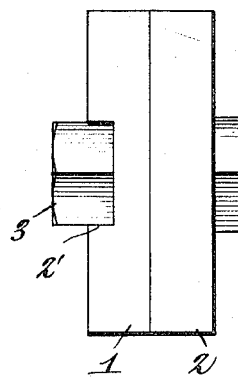
Figure 2:
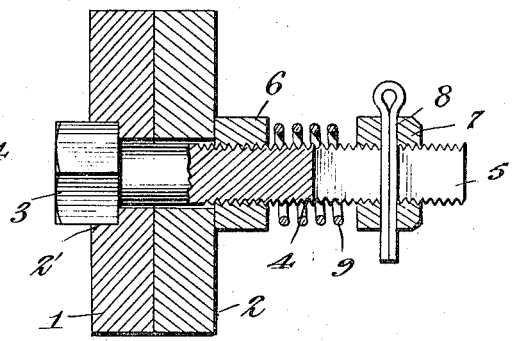
Figure 5:
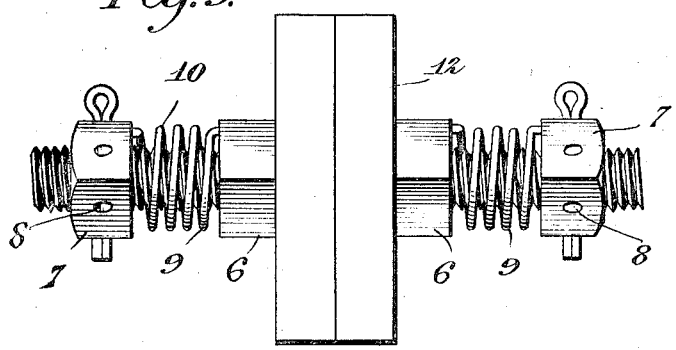
Figure 6:
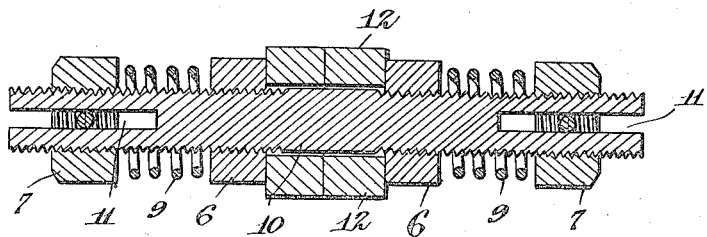
Figure 7:
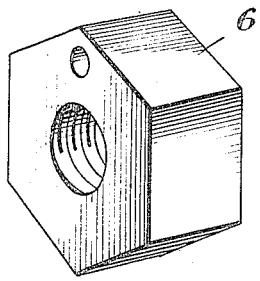
Figure 8:
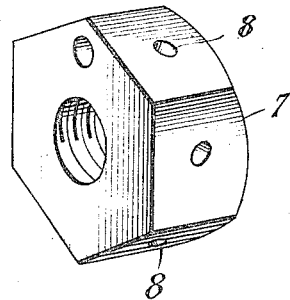
Figure 9:
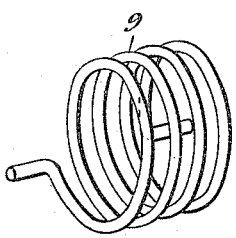

A further object of the invention is to produce a nut lock which will be strong, cheap and durable and which will effectively prevent the accidental unscrewing of the nuts from a bolt by the shock and jar incident to the structure connected by the bolt and nuts.
With the above and other objects in view, the improvement resides in the construction, combination and arrangement of parts set forth in the following specification and falling within the scope of the appended claim.
In the drawings: Figure 1 is an elevation illustrating the application of my improvement upon a bolt connecting two plates, Fig. 2 is a central vertical longitudinal sectional view through the same, Fig. 3 is a view of the bolt, Fig. 4 is a view of the nuts connected by the spiral resilient member, Fig. 5 is an elevation illustrating the arrangement of parts when a headless bolt is employed, Fig. 6 is a central horizontal sectional view through the same, Fig. 7 is a perspective view looking toward the outer face of the inner nut, Fig. 8 is a similar view looking toward the outer face of the inner nut, and Fig. 9 is a perspective view of the spirally wound spring member connecting the nuts.

It is to be understood that the device is adapted for use upon any structure which is subject to vibration, such for instance as railway construction, bridge construction, vehicle construction or engine construction, and in the drawings I have shown the application of the same in connection with two connected plates 1 and 2 respectively. The plates have alining bolt openings and the plate 1 upon its outer face is provided with a notch or depression 2 which communicates with its bolt opening. The opposite walls of this nut 2 are adapted to be contacted by the head 3 of the bolt, the shank 4 of which passes through the openings in the plate and the threaded end of said shank projects a suitable distance beyond the plate 2. The shank 4 of this bolt is slotted longitudinally, as at 5, and threaded upon the said bolt is an inner nut 6 and an outer nut 7. The outer nut 7 is provided with a plurality of radially disposed orifices 8, each of which intersects the bore of the nut and one of which being substantially at all times arranged in a line with the slot in the bolt. The outer face of the inner nut is provided with one or more depressions and the inner face of the outer nut is likewise provided with one or more depressions. Surrounding the shank of the bolt is a coil spring 9 which has its end convolutions bent to extend outwardly in opposite longitudinal directions, and one of these ends is adapted to be received in the referred to orifices in the inner face of the outer nut, while the second end is likewise received in the orifice or aperture in the outer face of the inner nut. It is, of course, to be understood that the coil spring member may remain a permanent fixture between the nuts, but preferably the same is connected with the nuts as just described. After the inner nut has been screwed home upon the plate the spring member is arranged upon the bolt and connected with the said inner nut just described. Thereafter the outer nut is screwed upon the bolt and is connected with the spring as described. When the spring is thus connected with the outer nut, the screwing of the same in a homeward direction upon the bolt will wind the coils of the spring, causing the same to exert a tension to move the inner nut in a screwing direction or in a tighter frictional contact with the plate 2. When the spring has been sufficiently wound to insure the proper frictional engagement of the said inner nut with the said plate 2, a securing element such as a cotter pin is passed through one of the radial openings in the outer nut and also through the slot in the bolt, thus locking the outer nut upon the bolt.

Figure 3:
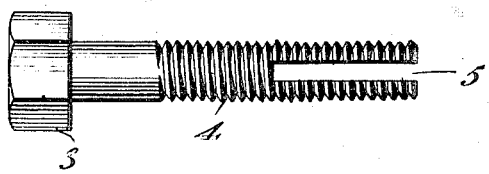
Figure 4:
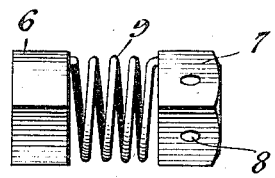

In Figs. 3 and 4 the construction is substantially similar to that just described, except that the bolt 10 is headless and has both of its ends threaded and both of its said ends formed with a longitudinally extending slot 11. The inner nut contacts with the outer faces of the plates 12 through which the bolt is passed and after the coil springs have been sufficiently wound to insure the proper frictional contact of the said inner nuts with the said plates, the outer nuts will be secured to the bolt by having removable elements, such as cotter pins, passed through the orifices which aline with the slots in the ends of the bolt, thus locking all the outer nuts upon the bolt and the inner nuts in frictional contact with the plates.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

The combination with a plate and a bolt having a slotted shank passing through the plate, of a nut screwed upon the bolt and contacting with the plate, a second nut also screwed upon the bolt but spaced from the first mentioned nut, a coil spring surrounding the bolt and having its ends connected with the nuts, and means comprising a member passing through the outer nut and through the slot of the bolt for locking the said nut to the bolt.

In testimony whereof I affix my signature in presence of two witnesses.

JOHN L. SEABERG.

Witnesses:
WALTER W. RILEY,
CONRAD CARL.